US012151858B2

(12) United States Patent
Chang

(10) Patent No.: US 12,151,858 B2
(45) Date of Patent: Nov. 26, 2024

(54) TAPE-FREE PACKING BOX

(71) Applicant: Fan-Yi Chang, Nantou (TW)

(72) Inventor: Jui-Yang Chang, Taichung (TW)

(73) Assignee: Fan-Yi Chang, Nantou (TW)

( * ) Notice: Subject to any disclaimer, the term of this patent is extended or adjusted under 35 U.S.C. 154(b) by 201 days.

(21) Appl. No.: 17/751,401

(22) Filed: May 23, 2022

(65) Prior Publication Data

US 2022/0380085 A1 Dec. 1, 2022

(30) Foreign Application Priority Data

May 28, 2021 (CN) .......................... 202110590454.9

(51) Int. Cl.
*B65D 5/66* (2006.01)
*B65D 5/42* (2006.01)

(52) U.S. Cl.
CPC .......... *B65D 5/6608* (2013.01); *B65D 5/4283* (2013.01); *B65D 5/6611* (2013.01)

(58) Field of Classification Search
CPC .... B65D 5/643; B65D 5/6611; B65D 5/6605; B65D 5/6608; B65D 5/4283; B65D 5/6647; B65D 2313/02
USPC ......... 229/125.37–125.41; 24/545, 546, 563, 24/570
See application file for complete search history.

(56) References Cited

U.S. PATENT DOCUMENTS

| 1,705,245 | A | * | 3/1929 | Elias | B65D 5/643 |
| | | | | | 29/512 |
| 1,869,927 | A | * | 8/1932 | Wurzburg | B65D 5/6611 |
| | | | | | 229/125.38 |
| 2,256,834 | A | * | 9/1941 | Mandel | B65D 5/643 |
| | | | | | 229/125.39 |
| 2,807,406 | A | * | 9/1957 | Lowrey, Sr. | B65D 5/448 |
| | | | | | 229/125.38 |
| 3,550,837 | A | * | 12/1970 | Erb | A44B 18/0003 |
| | | | | | 24/448 |
| 6,435,349 | B1 | * | 8/2002 | Jackson | B65D 11/1833 |
| | | | | | 206/427 |
| 8,701,975 | B2 | * | 4/2014 | Farris | B65D 5/6647 |
| | | | | | 220/315 |
| 10,023,353 | B2 | * | 7/2018 | Chan | B65D 11/22 |
| 11,873,145 | B2 | * | 1/2024 | Brown | B65D 5/6611 |
| 2018/0057203 | A1 | * | 3/2018 | Chan | B65D 11/10 |
| 2020/0010231 | A1 | * | 1/2020 | Chan | B65D 5/3621 |

FOREIGN PATENT DOCUMENTS

CN 106672379 A * 5/2017
JP 2013252887 A * 12/2013

* cited by examiner

*Primary Examiner* — Nathan J Newhouse
*Assistant Examiner* — Phillip D Schmidt
(74) *Attorney, Agent, or Firm* — Muncy, Geissler, Olds & Lowe, P.C.

(57) ABSTRACT

A tape-free packing box, which can be in an open state or a closed state, the tape-free packing box comprises a box body; two tongue plates, respectively arranged on the opposite sides of the open ends of the box body; a connecting element, one end of the connecting element is integrally formed or slidably installed on one of the two tongue plates, when the tape-free packing box is in a closed state, the other end of the connecting element is connected to the other of the two tongue plates.

18 Claims, 5 Drawing Sheets

TAPE-FREE PACKING BOX

BACKGROUND

Technical Field

The present disclosure relates generally to the technical field of packing boxes, and more particularly to a tape-free packing box.

Related Art

Packing boxes are mainly used for loading, transportation, and storage. Conventionally, tapes are used to seal the opening of the packing box, and the tongue plates at the opening of the packing box are straight and symmetrical. During daily use and circulation of the packing boxes containing products, the tapes may be damaged or loosened, or the adhesion may become weak. As a result, the opening of the box cannot be completely sealed and the products inside may be exposed. Some people, acting dishonestly, may take away part of the products and seal the box again. Moreover, using tapes to seal the boxes is not in line with environment protection, and not secure enough. Attaching the tape is also an extra packing process that leads to higher cost and lower efficiency. In view of this, some sort of solution is needed.

SUMMARY

The object of the present disclosure is to provide a tape-free packing box, which can be tightly closed through its own structure. No tape is used to seal the opening and the service life is longer.

The present disclosure provides a tape-free packing box that can be in an open or closed state, comprising: a box body; two tongue plates, respectively configured on the opposite edges of the upper opening end of the box body; a connecting component, one end of which is integrally formed or slidably configured on one of the two tongue plates. When the tape-free packing box is in the closed state, the other end of the connecting component is connected to the other of the two tongue plates.

As a preferred embodiment, the connecting component includes a connecting part, the connecting part is formed on the free end of the tongue plates, the connecting part has a protruding section and a connecting section, the width of the protruding section is larger than the width of the connecting section, and the connecting parts have shapes to coordinate with each other; In particular, two connecting plates are respectively configured on the upper surface of one tongue plate of the two tongue plates and the lower surface of the other tongue plate. When the tape-free packing box is in the closed state, the other end of the connecting component is connected to the other of the two tongue plates, so that the two connecting plates are laminated and connected with each other through a joining structure.

As a preferred embodiment, the opening end of the box body is configured to be rectangular, the four sides of the opening end of the box body are all configured with tongue plates, and the free ends of the tongue plates on the opposite sides of the outermost layer are both formed with matching and interlocking connecting parts.

As a preferred embodiment, the connecting part is configured to be in the shape of a water drop, an arrow, a trapezoid, a mushroom or any combination thereof with the width of the protruding section larger than that of the connecting section.

As a preferred embodiment, the joining structure is made up of a plurality of female snap buttons configured on the inner surface of the connecting plate on one side and a plurality of male snap buttons configured on the outer surface of the connecting plate on the opposite side, positioned to correspond to the female snap buttons. Alternatively, the joining structure is made up of a Velcro strap configured on the inner surface of the connecting plate on one side and another Velcro strap configured on the outer surface of the connecting plate on the opposite side, positioned to correspond to this Velcro strap. Alternatively, the joining structure is made up of a magnetic block configured on the inner surface of the connecting plate on one side and another magnetic block configured on the outer surface of the connecting plate on the opposite side, positioned to correspond to this magnetic block.

As a preferred embodiment, the two opposite ends of the connecting plate on the outermost layer are both formed with an extending plate. The inner side face of the extending plate and the outer side face of the box body are connected to each other via a reinforcement joining structure.

As a preferred embodiment, the reinforcement joining structure is configured to be Velcro straps or snap buttons.

As a preferred embodiment, the opposite ends of the two connecting plates are both formed with an extending plate. the conjunction between the opposite tongue plates on the inner layer and the box body forms a slot for inserting the extending plate.

As a preferred embodiment, the outer surface of one tongue plate on the outermost layer is connected with a plastic sealing bar, and the outer surface of the opposite tongue plate on the outermost layer is configured with a suspension ring.

As a preferred embodiment, the box body is an integrally formed rectangular box body, the two tongue plates is formed on the upper opening end and/or the lower opening end of the box body; the connecting component is a sealing pull bar, the connecting component is configured along the length of the upper opening end and/or the lower opening end of the box body, the connecting component includes a horizontal section and two extended connecting sections, the two extended connecting sections are respectively and integrally formed on the opposite sides along the length of the horizontal section, the horizontal section is configured with a plurality of locking holes and a plurality of kidney holes, and these locking holes and kidney holes are respectively located on the opposite sides along the length of the horizontal section; the box body is configured with a plurality of locking blocks, these locking blocks respectively match the locking holes and kidney holes, these locking blocks are respectively connected through screws to the opposite tongue plates along the length of the box body, so that the connecting component is movably connected on the tongue plate on one side, and the locking blocks corresponding to the kidney holes are connected to the tongue plate on the other side through screws going through the kidney holes.

As a preferred embodiment, the locking hole includes a main through hole and a withdrawing hole. The main through hole and the locking block have matching contours, the withdrawing hole corresponds to the screw, and the main through hole and the withdrawing hole are intercommunicated; Between the surfaces of the locking block and the box body, a gap is formed for movement of the connecting component; When the tape-free packing box is in the closed state, the locking blocks corresponding to the horizontal section all go through the locking holes on the horizontal section, and the screw is correspondingly placed into the withdrawing hole.

As a preferred embodiment, the two opposite sides along the width of the box body are respectively configured with a second locking block. Each of these second locking blocks coordinates with the extended connecting section through a second screw.

As a preferred embodiment, the connecting component is correspondingly configured, in a crossing and pressing manner, between the tongue plates on the two sides along the length, the two extended connecting sections are respectively and correspondingly folded toward the two lateral sides of the box body along the width. The second locking blocks located along the width of the box body respectively and correspondingly go through the locking holes on the extended connecting section on one side, and the second screws are correspondingly locked into the withdrawing holes. The length of the horizontal section is equal to that of the box body.

As a preferred embodiment, the number of locking holes configured on the horizontal section is A, the number of the kidney holes configured on the horizontal section is B, and the number of locking blocks configured on the tongue plates on each side along the length on the upper opening end and/or lower opening end of the box body is C, A=B=C, C≥2.

As a preferred embodiment, at least one of the two lateral sides along the width of the box body is configured with an anti-dismantle snap button. The part of the anti-dismantle snap button extending out of the box body after going through the at least one of the two lateral sides is configured with an anti-dismantle strap hang hole. One side of the extended connecting section has the locking hole, and the other side the extended connecting section has a through hole; in the closed state, the anti-dismantle snap button firstly goes through the through hole, and then an anti-dismantle strap is inserted into the anti-dismantle strap hang hole.

As a preferred embodiment, the edges of the extended connecting sections on the two sides are both configured with a finger draw hole.

As a preferred embodiment, the tongue plates along the length on the upper and lower sides the box body are both formed with a plurality of sets of locking structure. Each set of locking structure includes an insert tongue and a slot. The insert tongue is wide on the outer side and narrow on the inner side and its shape matches that of the slot. The insert tongue is formed on the edge of one side of the tongue plate along the length, and the slot is formed on the edge of the other side of the tongue plate along the length. Beside the insert tongue of the tongue plate on the same side, another slot is formed.

As a preferred embodiment, the number of locking structures is configured to be D, D≥2.

As a preferred embodiment, the inner surface of the tongue plate on one side of the upper opening end and/or lower opening end of the box body along the length is fixed with a connecting plate through screws; the length of the connecting plate is E, the length of the tongue plate along the length is F. In the closed state, the distance between the two opposite tongue plates along the width is G, F>E>G.

As a preferred embodiment, at least one of the four outer side faces of the box body is configured to be a non-slip surface.

As a preferred embodiment, the non-slip surface is configured to have a non-slip film or to be a coarse surface.

As a preferred embodiment, the width of the kidney hole is M, and the diameter of the screw is N, M=N.

DETAILED DESCRIPTION

For better understanding of the features and technical means the present disclosure as well as the objects and functions to be accomplished, the present disclosure is described in detail below with respect to specific embodiments and with reference to the accompanying figures.

In the present disclosure, unless otherwise specified or defined, the terms "install", "link", "connect", and "fix" shall be construed broadly. For example, they can mean "fixed connection", or "detachable connection", or "integral connection"; they can be "mechanical connection" or "electrical connection"; they can be "direct connection", "indirect connection through a medium", or "internal connection between two components". Those skilled in the art can interpret the above terms in the present disclosure based on specific conditions and understand their specific meanings.

Figure 1:
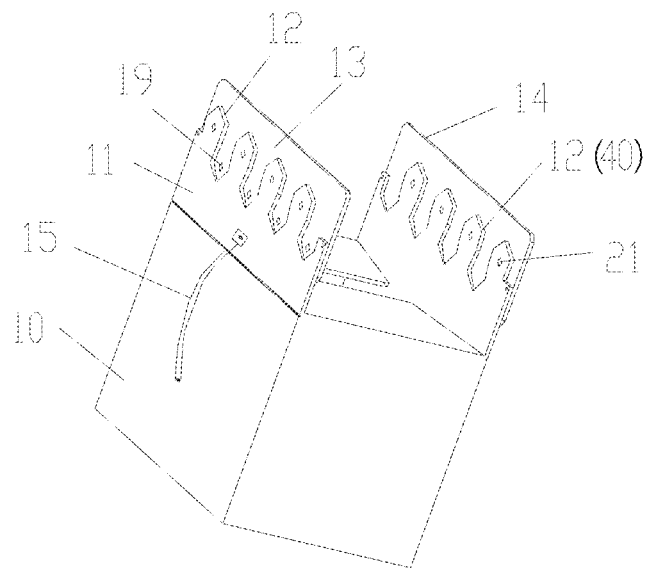
FIG. 1 is First Embodiment of the present disclosure.
Figure 2:
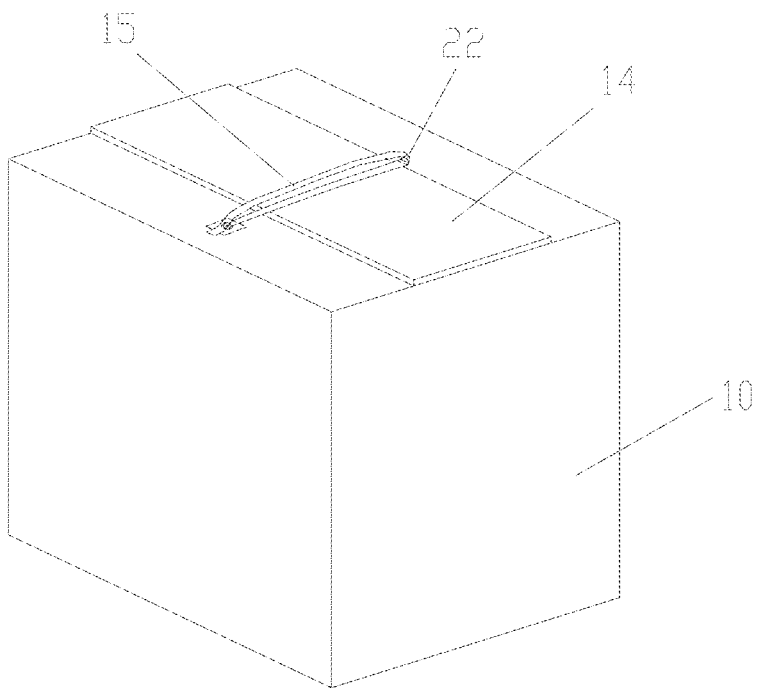
FIG. 2 is First Embodiment of the box body of the present disclosure in the closed state.
Figure 3:
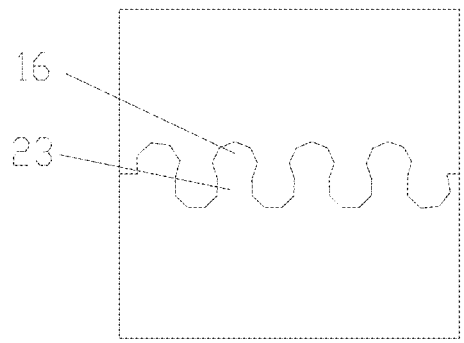
FIG. 3 is a plane view of the connecting parts of the two opposite sides.

Depicted in FIGS. 1-3 is the first embodiment of the present disclosure. The present disclosure provides a tape-free packing box, which can be in an open or closed state. The tape-free packing box comprises a box body 10, two tongue plates 11 respectively configured on the opposite edge of the box body 10 on the opening end. One end of the connecting component 40 is fixed on one of the two tongue plates 11. Specifically, one end of the connecting component 40 is integrally formed on one of the two tongue plates 11. When the tape-free packing box is in the closed state, the other end of the connecting component is connected to the other of the two tongue plates 11.

In this embodiment, the opening end of the box body 10 is configured with tongue plates 11 on the periphery. The two opposite tongue plates 11 covering on the outermost layer of the box are both configured with connecting component 40. The connecting component 40 includes the matching and interlocking free ends of the tongue plates 11 on the opposite sides. The width of the protruding section 16 is larger than that of the connecting section 23 of the connecting part 12. The connecting part 12 is configured to be in the shape of a water drop. The outer connecting plate 14 is configured on the lower surface of the tongue plate 11 on one side, and its position corresponds to the connecting part 12 of the tongue plate 11 on one side. The inner connecting plate 13 is configured on the upper surface of the tongue plate 11 on the opposite side, and its position corresponds to the connecting part 12 of the tongue plate 11 on this side. When the outer connecting plate 14 is located exactly above the inner connecting plate 13, the box body 10 is in the closed state and sealed. The inner connecting plate 13 and the outer connecting plate 14 are interconnected through a joining structure. The joining structure includes a plurality of female snap buttons 21 configured on the inner surface of the outer connecting plate 14 and a plurality of male snap buttons 19 configured on the outer surface of the inner connecting plate 13 to coordinate with the female snap buttons 21. To ensure smooth connection between the outer connecting plate 14 and the inner connecting plate 13, the female snap buttons 21 are embedded into the inner surface of the outer connecting plate 14 and kept at the same level as the inner surface. On one hand, through coordination between the female snap buttons 21 and the male snap buttons 19, the inner connecting plate 13 and the outer connecting plate 14 are tightly connected. On the other hand, in order to achieve the anti-dismantling effect, one tongue plate 11 on the outermost layer is connected with a plastic sealing bar 15, whereas the tongue plate 11 on the outermost layer at the opposite side is configured with a suspension ring 22. To open the box body, the user must break the plastic sealing bar 15. If the user finds the plastic sealing bar 15 is broken, it is very likely that the box body has been tampered by someone else. In the present embodiment, the two sides coordinate with each other in an interlocking manner. With the width of the protruding section being larger than that of the connecting section, the connecting part can tightly close and seal the box body. As the width of the protruding section is larger than that of the connecting section, during the movement, the tongue plates on the opposite sides will not fall apart along the opposite directions. Thus, no adhesive is needed for sealing. The outer connecting plate and inner connecting plate further press the connecting part to reinforce the tightness of closing and sealing. On the other hand, when opening the box, as the connecting part 12 is in an irregular shape, and the connection is in a coordinating and interlocking form, with the width of the protruding section being larger than that of the connecting section, if the snap buttons are pulled open one by one, the connecting part 12 will deform to affect the sealing effect when the box is closed and sealed again. Therefore, through the outer connecting plate 14 and inner connecting plate 13, the connecting part 12 is separated at once to avoid deformation of the connecting part, thus increasing the service life of the box.

As a preferred embodiment, the joining structure includes a Velcro strap configured on the inner surface of the outer connecting plate 14, and another Velcro strap configured on the outer surface of the inner connecting plate 13 to coordinate with the aforesaid Velcro strap.

As a preferred embodiment, the joining structure includes a magnetic block configured on the inner surface of the outer connecting plate 14, and another magnetic block configured on the outer surface of the inner connecting plate 13 to coordinate with the aforesaid magnetic block.

In the Second Embodiment, the box body 10 is configured to be rectangular, and the four sides of the opening end of the box body 10 are all configured with tongue plates 11. The free ends of the tongue plates 11 on the opposite sides are both formed with matching and interlocking connecting parts 12. Other details are the same as the first embodiment (not shown in the figure). Through such a structural configuration, two layers of connecting parts 12 are laminated on the opening end of the box body. Thus the tight closing and sealing is further reinforced.

Figure 4:
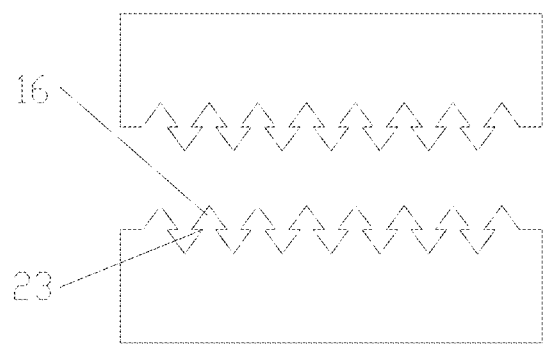
FIG. 4 is the third embodiment of the present disclosure.

In the Third Embodiment of the present disclosure, as shown in FIG. 4, the connecting part 12 is configured to be in the shape of an arrow with the width of the protruding section larger than that of the connecting section. Other details are the same as the first embodiment.

Figure 5:
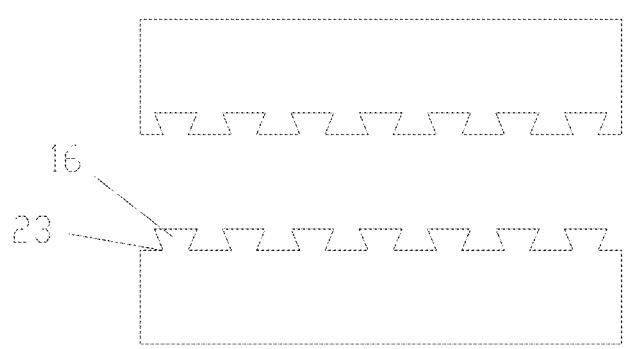
FIG. 5 is the fourth embodiment of the present disclosure.

In the Fourth Embodiment, as shown in FIG. 5, the connecting part 12 is configured to be in the shape of a trapezoid with the width of the protruding section larger than that of the connecting section. Other details are the same as the first embodiment.

Figure 6:
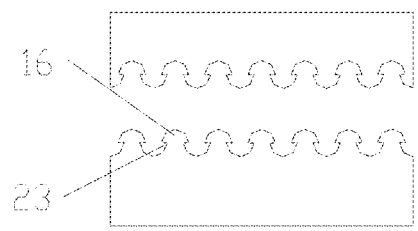
FIG. 6 is the fifth embodiment of the present disclosure.

In the Fifth Embodiment, as shown in FIG. 6, the connecting part 12 is configured to be in the shape of a mushroom, with the width of the protruding section larger than that of the connecting section. Other details are the same as the first embodiment.

In the Sixth Embodiment, the connecting part 12 is configured to be a combination of the aforesaid shapes, with the width of the protruding section larger than that of the connecting section. Other details are the same as the first embodiment (not shown in the figures).

Figure 7:
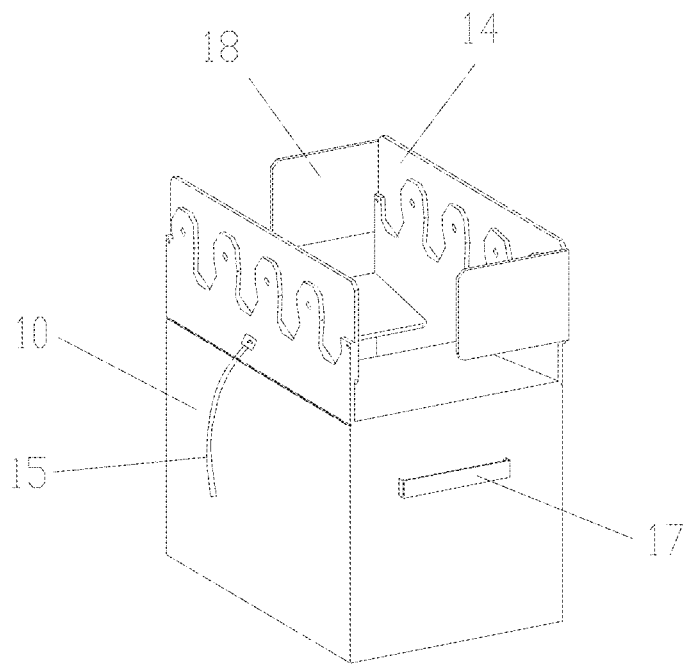
FIG. 7 is the seventh embodiment of the present disclosure.

In the Seventh Embodiment, as shown in FIG. 7, the two opposite ends of the outer connecting plate 14 are both formed with extending plates 18. The extending plates 18 are connected to the outer side faces of the box body 10 through the reinforcement joining structures 17. The reinforcement joining structures 17 can be configured to be Velcro straps or snap buttons. Other details are the same as the first embodiment. Through such a structural configuration, the tightness of closing and sealing can be reinforced.

Figure 8:
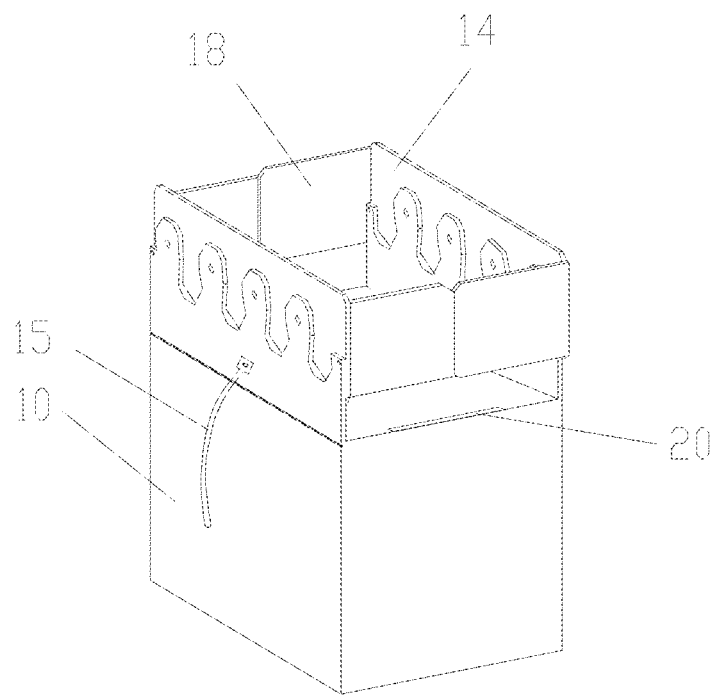
FIG. 8 is the eighth embodiment of the present disclosure.

In the Eighth Embodiment, as shown in FIG. 8, the opposite ends of the outer connecting plate 14 and inner connecting plate 13 are both formed with extending plates 18. The junctions between the tongue plates 11 on the opposite inner sides and the box body 10 are formed with slots 20 for insertion of the extending plates 18. Other details are the same as the first embodiment. Through such a structural configuration, the tightness of closing and sealing is reinforced.

Figure 9:
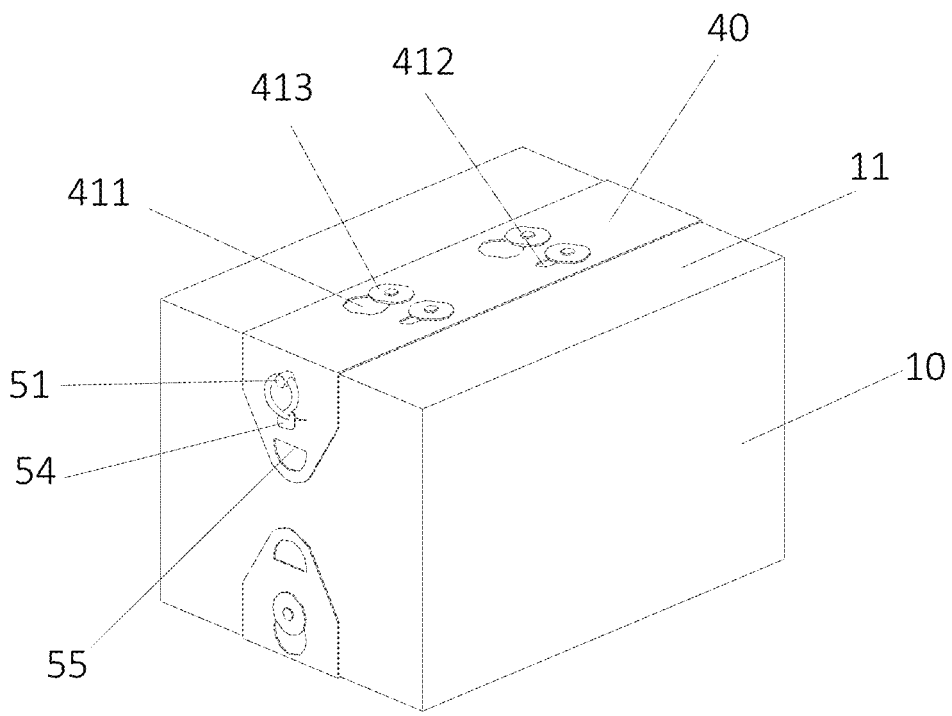
FIG. 9 is a perspective view of the ninth embodiment of the present disclosure in use.
Figure 10:
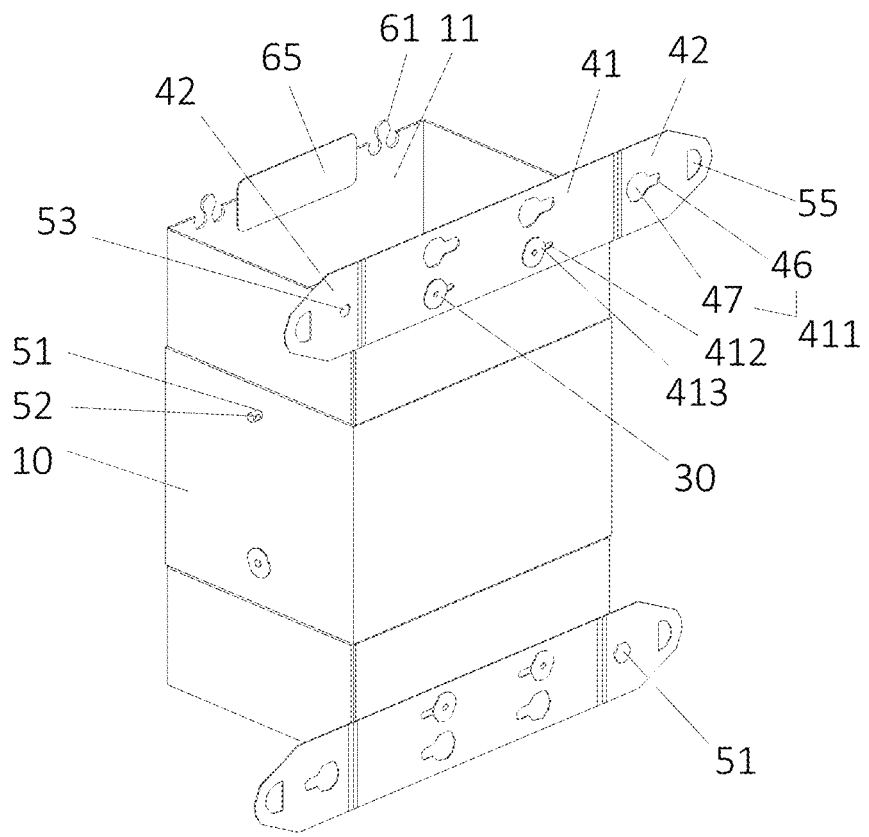
FIG. 10 is a perspective view of the ninth embodiment of the present disclosure in the open state.
Figure 11:
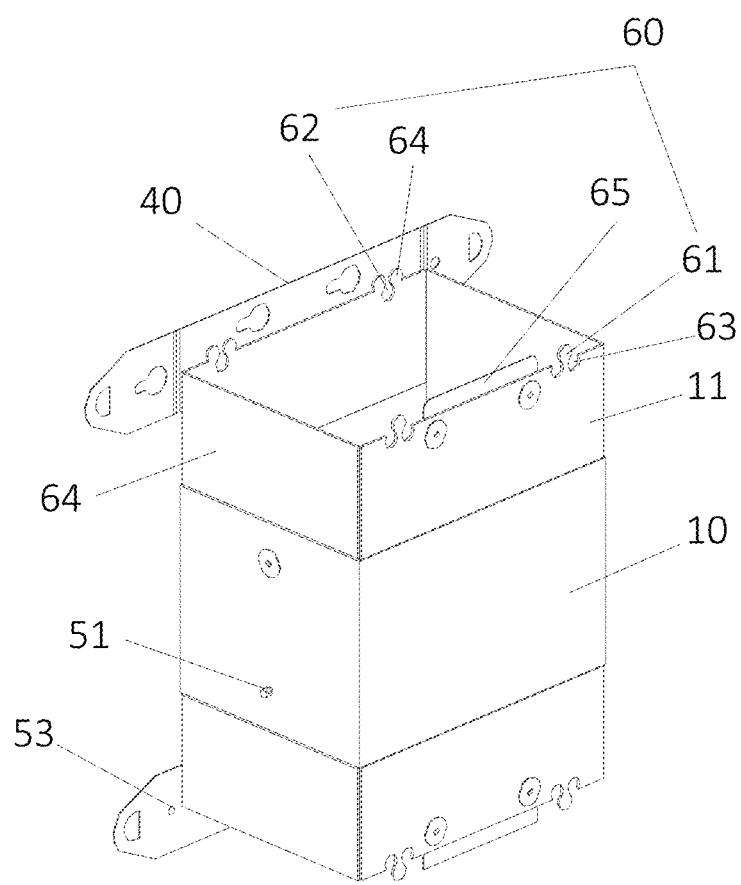
FIG. 11 is a perspective view of the ninth embodiment of the present disclosure in the open state (from another perspective).

In the Ninth Embodiment, as shown in FIGS. 9-11, a tape-free packing box, which can be in the open or closed state, tape-free packing box includes a box body 10; two tongue plates 11 respectively configured on the opposite edges of the opening end of the box body 10; a connecting component 40, with its one end slidably configured on one of the two tongue plates 11. Specifically, the connecting component 40 can slide in relation to the tongue plates 11 along the length of the tongue plates 11. When the tape-free packing box is in the closed state, the other end of the connecting component 40 is connected to the other of the two tongue plates 11. In this embodiment, box body 10 is an integral rectangular box body formed by folding. The upper opening end and lower opening end of the box body 10 are both formed with tongue plates 11 on the periphery. The connecting component 40 is a sealing pull bar configured along the length of upper opening end and/or lower opening end of the box body. The sealing pull bar can be made of soft rubber with certain elasticity. The connecting component 40 includes a horizontal section 41 and an extended connecting section 42 integrally formed on the opposite ends of the length of the horizontal section 41. The length of the horizontal section 41 equals that of the box body 10. The horizontal section 41 is configured with a plurality of locking holes 411 on one side along the length. The horizontal section 41 is configured with a plurality of kidney holes 412 on the other side along the length to coordinate with the locking holes 411. The extended connecting section 42 on one side is configured with a locking hole 411. The tongue plates 11 on the opposite sides of the box body 10 along the length are both connected through screws 30 with a plurality of locking blocks 413, which respectively coordinate with the locking holes 411 and kidney holes 412. Between the surfaces of the locking blocks 413 and the box body 10, a gap is formed for the movement of the connecting component 40. The locking block 413 on the side corresponding to the kidney hole 412 goes through the kidney hole 412 through a screw 30, so that the connecting component 40 is movably connected on the tongue plate 11 on one side. The opposite sides of the box body 10 along the width are both connected with locking blocks 413 (or referred to as second locking blocks) through screws 30 (or referred to as second screws) to coordinate with the extended connecting sections 42. The locking hole 411 includes a main through hole 47 and a withdrawing hole 46. The main through hole 47 and the locking block 413 have matching contours. The withdrawing hole 46 can coordinate with the screw 30. The main through hole 47 and the withdrawing hole 46 are intercommunicated. The main through hole 47 is configured to be in a round shape. The locking block 413 is configured to be in a round shape. The length of the kidney hole 412 is larger than or equal to the diameter of the locking block 413.

During usage, the connecting component 40 on the upper and lower sides are placed between the tongue plates 11 on the two opposite sides along the length of the box body 10 in a crossing and pressing manner. The extended connecting sections 42 on both sides are respectively folded toward the two lateral sides of the box body 10 along the width. The locking blocks 413 located on the two opposite sides of the box body 10 along the width respectively go through the locking holes 411 on the extended connecting section 42 on each side, and their screws 30 are correspondingly locked into the withdrawing holes 46. The locking blocks 413 corresponding to the horizontal section 41 all go through the locking holes 411 on the horizontal section 41 and their screw 30 are correspondingly locked into the withdrawing holes 46. The present disclosure does not need adhesion. The user only needs to pull the connecting component 40 (sealing pull bar), which can close and seal the box through coordination of the locking holes 411 and the locking blocks 413. To unpack the box, the user needs to pull the connecting component 40 in the opposite direction to separate the locking blocks 413 from the locking holes 411. The operation is simple and easy. Meanwhile, the present disclosure will have a longer service life. The rectangular box body is integrally formed by folding. To store the boxes, the user needs to press the box body 10 along the folding lines to flatten the boxes for stacking and storage. In this way, the storage space is considerable reduced.

The number of locking holes 411 configured on the horizontal section 41 is A. The number of kidney holes 412 configured on the horizontal section 41 is B. The number of locking blocks 413 configured on the tongue plate 11 on each side of the upper opening end and lower opening end of the box body 10 is C, A=B=C, C≥2. In the present embodiment, the number of locking holes 411 configured on the horizontal section 41 is 2, the number of kidney holes 412 configured on the horizontal section 41 is 2, the number of locking blocks 413 configured on the tongue plate 11 on each side of the upper opening end and lower opening end of the box body 10 along the length is 2.

As a preferred embodiment, the inner walls on the opposite sides of the box body 10 along the width are respectively configured with anti-dismantle snap buttons 51 to coordinate with the extended connecting section 42 on the side without locking holes 411. The part of the anti-dismantle snap buttons 51 extending out of the box body 10 after going through the box body 10 is configured with anti-dismantle strap hang holes 52. The extended connecting section 42 on the side without locking holes 411 is configured with through holes 53 for the anti-dismantle strap hang holes 52 to go through. In the closed state, after the anti-dismantle snap button 51 goes through the through hole 53, the anti-dismantle strap hang hole 52 is hung with an anti-dismantle strap 54. In order to open the box, the anti-dismantle strap must be cut off. Therefore, the present disclosure has a good anti-theft and anti-dismantle function to enhance safety.

As a preferred embodiment, the extended connecting sections 42 on the opposite sides are both configured with finger draw holes 55 at the position near the edge, to facilitate pulling of the connecting component 40. The user's finger can be directly inserted into the finger draw hole 55 to control the placement of the connecting component 40 in relation to the sides.

As a preferred embodiment, the tongue plates 11 of the box body 10 on the upper and lower sides along the length are both formed with multiple sets of locking structures 60. Each locking structure 60 includes an insert tongue 61 formed on the edge of the free end of the tongue plate 11 on one side along the length and in a shape being wide outside and narrow inside, and a slot 62 formed on the edge of the free end of the tongue plate 11 on the other side along the length, and in a shape that coordinates with the shape of the insert tongue 61 for insertion of the insert tongue 61. The edge of the free end of the tongue plate 11 on one side having the insert tongue 61, and the opposite sides of the insert tongue 61 are both concavely formed with lateral slots 63 with a narrow opening and a wide internal chamber (or referred to as another slot). The edge of the free end of the tongue plate 11 one the side having the slot 62, and the opposite sides of the slot 62 are both convexly formed with lateral inserting tongues 64 having a shape to match the shape of the lateral slot 63 on the same side. The number of locking structures 60 is configured to be D, D≥2. In the present embodiment, the number of locking structures 60 is configured to be 2. In actual applications, the insert tongue 61 is correspondingly inserted into the slot 62. Meanwhile, the lateral inserting tongue 64 is also correspondingly inserted into the lateral slot 63. Thus, the two tongue plates 11 along the length can be firmly sealed and connected to reinforce the sealing effect.

As a preferred embodiment, the inner surfaces of the tongue plates 11 of the box body 10 at one side along the length on the upper opening end and lower opening end are fixed through screw 30 with connecting plates 65. The length of the connecting plates 65 is E. The length of the tongue plates 11 along the length is F. In the closed state, the distance between the tongue plates 11 on the opposite sides along the width is G, F>E>G. In the closed state, the connecting plates 65 will be in contact with the tongue plates 11 on the opposite sides along the width. Thus, when the present disclosure is subject to forces in the direction of the upper opening end and lower opening end, the tongue plates 11 on the opposite sides along the width will not turn and collapse inward to damage the product contained inside.

As a preferred embodiment, at least one of the four outer side faces of the box body 10 is configured to be a non-slip surface. The non-slip surface is configured to be a non-slip film or a coarse surface. When the box body is flattened and stacked, the non-slip surface will increase the friction force between this box body and the one above it or beneath it. Thus, the stacked box bodies can be maintained vertically without slip and fall.

As a preferred embodiment, the width of the kidney holes 412 is M, the diameter of the screws 30 is N, M=N. Through such a configuration, when the connecting component 40 is pulled, screw 30 will exactly move along the length of the kidney holes 412 and will deviate to other directions. Thus, the accuracy can be enhanced when fastening or loosening the snap button.

What is claimed is:

1. A tape-free packing box, which can be in an open or closed state, comprising: a box body; two tongue plates, respectively configured on two opposite edges of an upper opening end of the box body; a connecting component, one end of the conne cting component integrally formed or slidably configured on one of the two tongue plates; when the tape-free packing box is in the closed state, the other end of the connecting component is connected to the other of the two tongue plates; wherein, the connecting component includes a connecting part, the connecting part is formed on a free end of the tongue plates, the connecting part has a protruding section and a connecting section, a width of the protruding section is larger than a width of the connecting section, and the connecting parts have shapes to coordinate with each other; wherein a first connecting plate is configured on an upper surface of one tongue plate, and a second connecting plate is configured on a lower surface of the other tongue plate, when the tape-free packing box is in the closed state, the other end of the connecting component is connected to the other of the two tongue plates, so that the first connecting plate and the second connecting plate are laminated and connected with each other through a joining structure, and the first connecting plate is elongated and covers a top of two tongue plates, and the second connecting plate is elongated and covers a bottom of two tongue plates.

2. The tape-free packing box of claim 1, wherein the connecting part is in a shape of a water drop, an arrow, a trapezoid or a mushroom.

3. The tape-free packing box of claim 1, wherein the joining structure is a female snap button and a male snap button, or two Velcro straps, or two magnetic blocks configured on two surfaces of the first connecting plate and the second connecting plate.

4. The tape-free packing box of claim 1, wherein two opposite ends of first connecting plate and the second connecting plate are both formed with an extending plate, an inner side face of the extending plate and an outer side face of the box body are connected to each other via a reinforcement joining structure.

5. The tape-free packing box of claim 4, wherein the reinforcement joining structure is configured on the inner side face of the extending plate as well as the outer side face of the box body, the reinforcement joining structure is Velcro straps or snap buttons.

6. The tape-free packing box of claim 1, wherein two opposite ends of the first connecting plate and the second connecting plate are both formed with an extending plate, the box body is formed with a slot for insertion of the extending plate.

7. The tape-free packing box of claim 1, wherein the two tongue plates are respectively configured with a sealing bar and a suspension ring on their outer surfaces.

8. The tape-free packing box which can be in an open or closed state, comprising:
a box body;
two tongue plates, respectively configured on two opposite edges of an upper opening end of the box body;
a connecting component, one end of the connecting component integrally formed or slidably configured on one of the two tongue plates;
when the tape-free packing box is in the closed state, the other end of the connecting component is connected to the other of the two tongue plates:
wherein:
the box body is an integrally formed rectangular box body, the two tongue plates are formed on the upper opening end and/or a lower opening end of a box body;
the connecting component is a sealing pull bar, the connecting component is configured along a length of the upper opening end and/or the lower opening end of the box body, the connecting component includes a horizontal section and two extended connecting sections, the two extended connecting sections are respectively and integrally formed on two opposite sides along the length of the horizontal section, the horizontal section is configured with a plurality of locking holes and a plurality of kidney holes, these locking holes and kidney holes are respectively located on the opposite sides along the length of the horizontal section;
the box body is configured with a plurality of locking blocks, these locking blocks respectively coordinate with the locking holes and the kidney holes, these locking blocks are respectively connected through screws to the tongue plate on one side of the opposite sides of the box body along the length, so that the connecting component is movably connected on the tongue plate on one side, and the locking blocks corresponding to the kidney holes are connected to the tongue plate on the other side through screws going through the kidney holes.

9. The tape-free packing box of claim 8, wherein the locking hole includes a main through hole and a withdrawing hole, the main through hole and the locking block have matching contours, the withdrawing hole corresponds to the screw, the main through hole and the withdrawing hole are intercommunicated; between the locking block and the box body, a gap is formed to allow movement of the connecting component; when the tape-free packing box is in the closed state, and the locking blocks corresponding to the horizontal section all go through the locking holes on the horizontal section and the screws are correspondingly locked into the withdrawing hole.

10. The tape-free packing box of claim 9, wherein the two opposite sides along the width of the box body are respectively configured with a second locking block, each of these second locking blocks is locked up with the extended connecting section through a second screw.

11. The tape-free packing box of claim 10, wherein the connecting component is correspondingly configured, in a crossing and pressing manner, between the two opposite tongue plates of the box body along the length, the two extended connecting sections are respectively and correspondingly folded toward the two opposite lateral sides of the box body along a width, the second locking blocks located along the width of the box body respectively and correspondingly go through the locking holes located on the extended connecting section on one side, and the second screws are correspondingly locked into the withdrawing holes, the length of the horizontal section is equal to that of the box body.

12. The tape-free packing box of claim 11, wherein the number of locking holes configured on the horizontal section is A, the number of kidney holes on the horizontal section is B, the number of locking blocks configured on the tongue plates on each side of the upper opening end and/or the lower opening end of the box body along the length is C, $A=B=C$, $C \geq 2$.

13. The tape-free packing box of claim 11, wherein at least one of the two lateral sides of the box body along the width is configured with an anti-dismantle snap button, the part of the anti-dismantle snap button extending out of the box body after going through the at least one of the two lateral sides is configured with an anti-dismantle strap hang hole, one side of the extended connecting section has the locking hole, the other side the extended connecting section has a through hole; in the closed state, the anti-dismantle snap button firstly goes through the through hole, and then an anti-dismantle strap is inserted into the anti-dismantle strap hang hole.

14. The tape-free packing box of claim 11, wherein, two edges of the extended connecting sections are both configured with a finger draw hole.

15. The tape-free packing box of claim 11, wherein the tongue plates along the length on upper and lower sides of the box body are both formed with a plurality of sets of locking structure; each set of locking structure includes an insert tongue and a slot, the insert tongue is wide on an outer side and narrow on an inner side, and its shape matches that of the slot, the insert tongue is formed on an edge of one side of the tongue plate along the length, the slot is formed on an edge of the other side of the tongue plate along the length, beside the insert tongue of the tongue plate on the same side, another slot is formed.

16. The tape-free packing box of claim 15, wherein the number of the locking structures is configured to be D, $D \geq 2$.

17. The tape-free packing box of claim 11, wherein an inner surface of the tongue plates along the length on the upper opening end and/or the lower opening end of the box body is fixed with a connecting plate through screws; the length of the connecting plate is E, the length of the tongue plate along the length is F, in the closed state, the distance between the two opposite tongue plates along the width is G, $F>E>G$.

18. The tape-free packing box of claim 11, wherein, at least one of four outer side faces of the box body is configured to be a non-slip surface, and the non-slip surface is a non-slip film or a coarse surface.

* * * * *